(12) United States Patent
Chen et al.

(10) Patent No.: US 9,665,593 B2
(45) Date of Patent: May 30, 2017

(54) DYNAMICALLY SYNCHING ELEMENTS IN FILE

(71) Applicant: INTERNATIONAL BUSINESS MACHINES CORPORATION, Amonk, NY (US)

(72) Inventors: Danny Y. Chen, Austin, TX (US); Fabian F. Morgan, Austin, TX (US); Sarah V. White Eagle, Austin, TX (US); Chuan Yang, Beijing (CN); Dan Dan Zheng, Beijing (CN); Zhe Yan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 13/852,571

(22) Filed: Mar. 28, 2013

(65) Prior Publication Data
US 2014/0297589 A1    Oct. 2, 2014

(51) Int. Cl.
G06F 17/00    (2006.01)
G06F 7/00    (2006.01)
G06F 17/30    (2006.01)
H04L 29/08    (2006.01)

(52) U.S. Cl.
CPC ........ *G06F 17/30174* (2013.01); *G06F 17/30* (2013.01); *G06F 17/30581* (2013.01); *H04L 67/1095* (2013.01)

(58) Field of Classification Search
CPC .................................................. G06F 17/211
USPC ........................................................ 707/624
See application file for complete search history.

(56) References Cited

U.S. PATENT DOCUMENTS

| | | | |
|---|---|---|---|
| 5,392,390 A * | 2/1995 | Crozier | 715/751 |
| 5,689,701 A * | 11/1997 | Ault et al. | 707/999.001 |
| 5,974,238 A * | 10/1999 | Chase, Jr. | 709/248 |
| 6,085,228 A | 7/2000 | Tharakan | |
| 6,233,589 B1 * | 5/2001 | Balcha et al. | 707/625 |
| 7,069,501 B2 | 6/2006 | Kunitake et al. | |
| 7,069,504 B2 | 6/2006 | Kunitake et al. | |
| 7,143,094 B2 * | 11/2006 | Arroyo et al. | 707/999.01 |
| 7,277,924 B1 | 10/2007 | Wichmann et al. | |
| 7,299,240 B1 * | 11/2007 | Crozier | 707/999.101 |
| 7,600,219 B2 * | 10/2009 | Tsantilis | 717/122 |
| 7,657,769 B2 | 2/2010 | Macey et al. | |
| 7,665,063 B1 | 2/2010 | Hofmann et al. | |

(Continued)

FOREIGN PATENT DOCUMENTS

CN    102968486 A    3/2013

OTHER PUBLICATIONS

May 5, 2015 Office Action in U.S. Appl. No. 13/852,685.

(Continued)

*Primary Examiner* — Pavan Mamillapalli
(74) *Attorney, Agent, or Firm* — Lisa Ulrich, Esq.; George Blasiak, Esq.; Heslin, Rothenberg, Farley & Mesiti

(57) ABSTRACT

An approach is provided for synchronizing elements in files across a technical environment. In one embodiment, a processor obtains a first change to a first file. The processor also obtains data identifying a second file. The processor determines if the change is supported by a data library in a pre-defined list of data sources. The processor analyzes the data library to determine a type of the change. The processor applies the type of the change to the second file.

20 Claims, 9 Drawing Sheets

(56) References Cited

U.S. PATENT DOCUMENTS

| | | | |
|---|---|---|---|
| 7,693,840 B1* | 4/2010 | Berck | G06F 17/3089 709/203 |
| 7,693,848 B2* | 4/2010 | Dejean et al. | 715/242 |
| 7,703,004 B2 | 4/2010 | Bier | |
| 7,738,497 B2 | 6/2010 | Vishnia-Shabtai et al. | |
| 7,779,395 B1 | 8/2010 | Chotin et al. | |
| 7,793,224 B1 | 9/2010 | Ayers | |
| 7,836,441 B2 | 11/2010 | Chen et al. | |
| 7,904,807 B2 | 3/2011 | Bell et al. | |
| 8,655,850 B2* | 2/2014 | Ngo et al. | 707/672 |
| 2002/0174329 A1 | 11/2002 | Bowler et al. | |
| 2002/0194484 A1* | 12/2002 | Bolosky et al. | 713/189 |
| 2003/0014445 A1* | 1/2003 | Formanek et al. | 707/526 |
| 2003/0160810 A1* | 8/2003 | Talley et al. | 345/703 |
| 2004/0019663 A1 | 1/2004 | Viswanath et al. | |
| 2004/0088653 A1* | 5/2004 | Bell et al. | 715/523 |
| 2005/0132346 A1* | 6/2005 | Tsantilis | 717/168 |
| 2006/0047974 A1* | 3/2006 | Alpern et al. | 713/191 |
| 2008/0065698 A1* | 3/2008 | French et al. | 707/200 |
| 2008/0189678 A1 | 8/2008 | Joe et al. | |
| 2008/0235578 A1 | 9/2008 | Heed et al. | |
| 2008/0276230 A1 | 11/2008 | Chang et al. | |
| 2009/0150569 A1* | 6/2009 | Kumar et al. | 709/248 |
| 2009/0204647 A1* | 8/2009 | Bentley et al. | 707/203 |
| 2010/0241948 A1 | 9/2010 | Andeen et al. | |
| 2011/0119676 A1 | 5/2011 | Gallant et al. | |
| 2011/0218964 A1 | 9/2011 | Hagan et al. | |
| 2012/0310937 A1 | 12/2012 | Stibel et al. | |
| 2012/0331128 A1 | 12/2012 | Seifert et al. | |
| 2013/0204837 A1* | 8/2013 | Sabharwal | 707/609 |

OTHER PUBLICATIONS

Aug. 5, 2015 Response to Office Action U.S. Appl. No. 13/852,685.
Sep. 2, 2015 Supplementary Response to Office Action U.S. Appl. No. 13/852,685.
Dec. 10, 2015 Final Office Action from U.S. Appl. No. 13/852,685.
Feb. 11, 2016 Office Action in U.S. Appl. No. 14/928,653.
May 11, 2016 Response to Office Action in U.S. Appl. No. 14/928,653.
May 11, 2016 Office Action in U.S. Appl. No. 13/852,685.
Aug. 25, 2016 Office Action in U.S. Appl. No. 14/928,653.
Office Action for U.S. Appl. No. 13/852,685, mailed on Sep. 28, 2016.
Office Action issued by the Chinese Patent Office for Chinese Patent Application No. 201410122905.6, mailed on Dec. 2, 2016.
Applicant's Response to Aug. 25, 2016 Non-Final Office action for U.S. Appl. No. 14/928,653, filed Nov. 25, 2016.
Applicant's Response to Sep. 28, 2016 Non-Final Office action for U.S. Appl. No. 13/852,685, filed Dec. 28, 2016.
Chen et al., Final Office Action for U.S. Appl. No. 14/928,653, filed Oct. 30, 2015 (U.S. Patent Publication No. 2016/0055172 A1), dated Apr. 4, 2017 (14 pages).
Chen et al., Final Office Action for U.S. Appl. No. 13/852,685, filed Mar. 28, 2013 (U.S. Patent Publication No. 2014/0298184 A1), dated Mar. 9, 2017 (22 pages).

\* cited by examiner

DYNAMICALLY SYNCHING ELEMENTS IN FILE

TECHNICAL FIELD

One or more aspects of the present invention relate to dynamically synchronizing elements in files in varying technical environments.

BACKGROUND

Consistency of elements in files and objects accessed in a computer environment assists administrators in maintaining the efficiency and functionality of the environment. For example, if an administrator installs a new version of server software that utilizes different file conventions, and the administrator who installs the software neglects to implement the new file conventions across the files accessed by the server, the system can experience inefficiencies, such as errors.

BRIEF SUMMARY

In one embodiment, there is provided a method dynamically synchronizing elements in a technical environment. The method includes obtaining, by the processor, a change to a first file and data identifying a second file. The method further includes determining, by the processor, if the change is supported by a data library specified in a pre-defined list of data sources. The method further includes analyzing, by the processor, the data library to determine a type of the change. The method further includes applying, by the processor, the type of the change to the second file.

In another embodiment, there is provided a computer program product for dynamically synchronizing elements in a technical environment. The computer program product includes a computer readable storage medium and program code stored on the computer readable storage medium. The program code is executable by a processing circuit to perform a method including obtaining, by the processing circuit, a change to a first file and data identifying a second file. The method further includes determining, by the processing circuit, if the change is supported by a data library specified in a pre-defined list of data sources. The method further includes analyzing, by the processing circuit, the data library to determine a type of the change. The method further includes applying, by the processing circuit, the type of the change to the second file.

Computer systems and methods relating to one or more aspects of the present invention are also described and may be claimed herein. Further, services relating to one or more aspects of the present invention are also described and may be claimed herein.

Additional features and are realized through other embodiments of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

Figure 1:
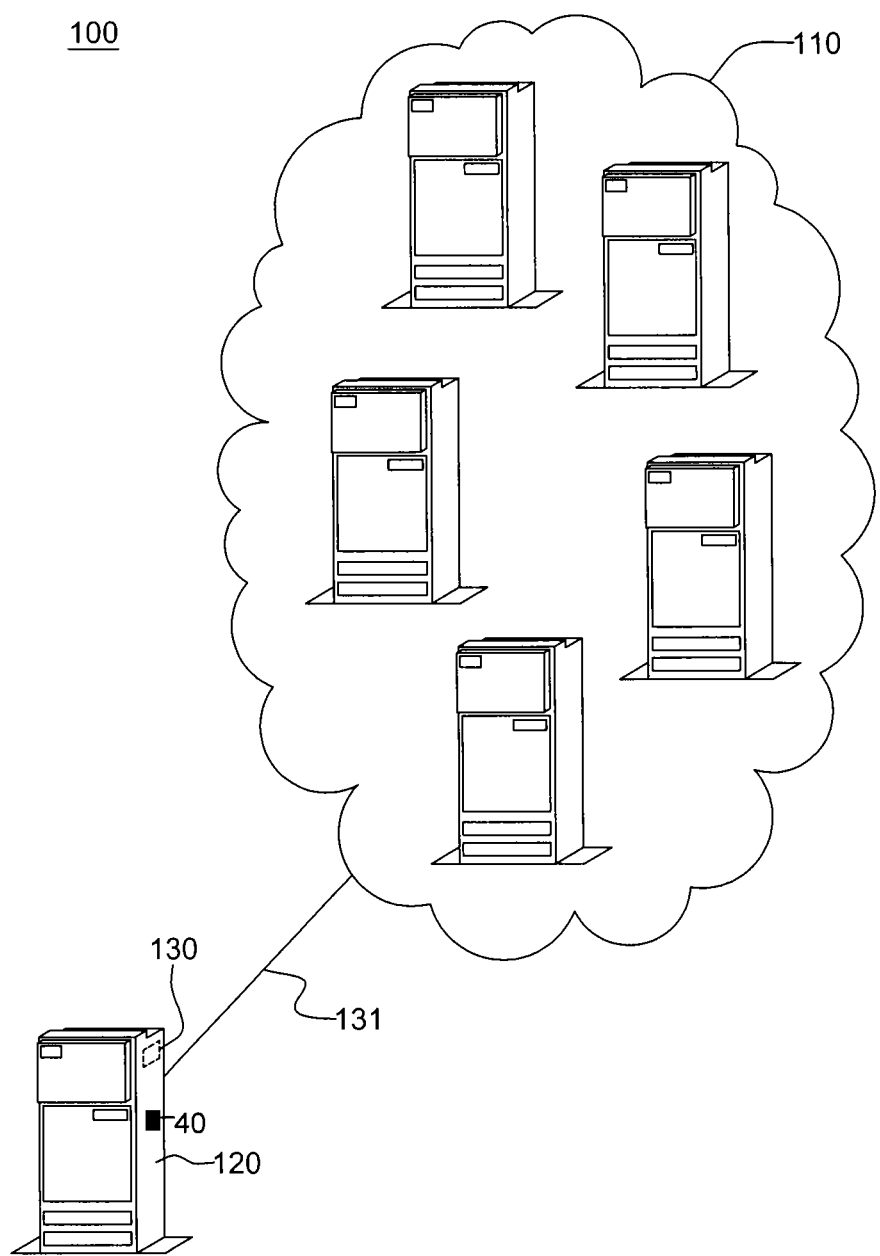
FIG. 1 depicts one example of a computing environment used to execute one or more aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

FIG. 1 depicts one example of a computing environment 100 used to execute one or more aspects of an embodiment of the present invention. In this embodiment, a computer system 110, which can include a cloud and/or an enterprise system, is being monitored by a server 120, which is connected to the computer system 110 via a network connection 131. This network connection 131 includes, but is not limited to, a wireless and/or a wired connection. Dynamic synchronization software 40 is being executed by one or more processors (not pictured) on the server 120. In further embodiments of the present invention, the dynamic synchronization software 40 is executed on a resource of the computer system 110. In further embodiments of the present invention, the execution of the software 40 is distributed on one of more resources external and/or internal to the computer system 110.

The server 120 and the additional resources within the computer system 110 each execute different software to enable a range of functionality to users connected to one or many of the resources. The computer logic, the code, that comprises the different software resides on memory resources (not pictured) internal and external to the server 120 and/or the various resources of the computer system 110. This computer logic includes, but is not limited to, the dynamic synchronization software 40. A client computing device (not pictured) connects to the server 120 and utilizes the different software implemented on the server 120 and on the computer system 110.

Computer system 110 and the server 120 access one or more data libraries 130. In FIG. 1, the data libraries 130 are centralized in memory on the server 120. However, in further embodiments of the present invention, the data libraries 130 are local to computing devices (not pictured), including but not limited to client computing devices, and/or resources in the computer system 110. In an embodiment of the present invention where computer system 110 is a cloud, the data libraries 130 are distributed over the various resources accessible to server 120. In various embodiments of the present invention, some of the libraries 130 may be local, and/or on memories that are accessible locally, while others are centralized either on the server 120 and/or one or more separate memories that are external but accessible to the server 120, including, but not limited to, on a cloud resource in a cloud computing environment.

The data libraries 130 house library data that define and support the changes in files in the computer system 110 and support the functionalities provided by the resources in the computer system 110. These files include, but are not limited to, a predefined list of data sources within the computing environment 100, and files containing computer code for execution by the processors of the resources in the computer system 110. In an embodiment of the present invention, the data libraries 130 are tracked in a pre-defined list saved on a computer system 110 resource.

Because the resources in the computing environment 100 are interconnected, if a user or a process makes a change on one resource, that change may inadvertently impact the operation of one or more additional resources. For example, a systems administrator and/or administrative process can upgrade an application on the server 120 with a new version that is not compatible with one or more files that worked with an older version of the application. In this example, the administrator and/or process upgrades an application on the server 120 in part by updating local files on the server 120, but does not update files utilizing this application on other resources in the computing environment 100. After this upgrade, a resource of the computer system 110 may attempt to access the server 120 utilizing a file compatible only with the old version of the application, thereby causing a system error. Although the changes (in this example, the updates to the local files on the server 120) have an impact on one or more resources of the computing environment 100 in addition to the server 120, the administrator and/or process only implemented the changes on one physical machine, the server 120. The administrator and/or process caused inconsistencies which impact the efficiency of the computing environment 100.

Accordingly, as set forth herein, when a change is made to a file, the software 40 obtains the change to the file. This change is the difference in the file between an existing item in the file and a new item. In an embodiment of the present invention, after a systems administrator and/or administrative process makes a change to a file on a resource in the computing environment 100, such as the server 120, the software 40 obtains the change. For example, in an embodiment of the present invention, a user utilizes a computing device (not pictured) with a communications connection to the server 120 to view and edit a file either residing on the server 120 and/or accessible to the server 120, termed a source file, for clarity. The user changes a certain element in the source file. The software 40 compares the original element in the source file to the changed element in the source file.

In addition to obtaining the change to the source file, the software 40 also obtains data identifying a second file within the computing environment 100. This second file, also referred to as a "target file" and is described in more detail in reference to the embodiment of FIG. 3.

After the software 40 obtains the change to the source file and the data identifying the target file, the software 40 determines if this change is supported by one or more of the data libraries 130. The software 40 checks the change, i.e., a changed element now in this source file and determines if one or more of the data libraries 130 support the change. A supported change is one that is consistent with the data in one or more of the data libraries 130, i.e., a known change. In response to the software 40 recognizing that the change to the source file is a known change, i.e., supported by one or more of the data libraries 130, the software 40 can apply the same type of change in making a similar change to the target file within the computing environment 100.

In accordance with an embodiment of the present invention, in making the similar change to the target file, the software 40 may analyze data in one or more of the data libraries 130 to formulate a new item to apply to the target file. In an embodiment of the present invention, the software 40 and may insert the new item into the target file, and may overwrite an existing item in the target file with this new item. The software 40 implements changes using one or more of the data libraries 130 that represent changes to file content and elements. In an embodiment of the present invention, the software 40 makes changes to the target file that are not always identical to the changes the systems administrator and/or administrative process made to the source file. Rather, the software 40 makes changes of the same type, as recognized by the software 40 by accessing one or more of the data libraries 130 and comparing a change in a source file to the data stored in one or more of the data libraries 130.

The new item that the software 40 gleans from analyzing one or more of the data libraries 130 is not necessarily identical to the changed item in the source file. Although the data in the target file may be different from the data in the source file, i.e. the target file can contain different text, the software 40 makes the same type of change to the target file that was made to the source file. For example, in an embodiment of the present invention, a user and/or process edits a source file to change language used to define a variable. Specifically, the user and/or process replaces the variable name in the source file with an abbreviation and a reference to a database table. The software 40 detects this change in the source file and then checks the change against one or more of the data libraries 130, to see if this change is defined in one or more of the data libraries 130. After the software 40 determines that the change is supported by one or more of the data libraries 130, the software 40 retains the change and makes the same type of change to the target file.

Because the data in the target file is not always identical to the data in the source file, after the software 40 makes the same type of change to the target file based on a change the software 40 obtained in the source file, neither original content of the source file and the target file nor the changed content of the source file and the target file may match. The software 40 analyzes one or more of the data libraries 130 and based on the data in one or more of the data libraries 130, the software 40 determines the type of change that was made to the source file and formulates how to apply this type of change to the target file. For example, in an embodiment of the present invention, the target file can contain old variable definition language and a different variable than the source file, but the software 40 will apply make the same type of change to the target file as was made to the source file.

The software 40 makes the same type of change to the target file as was made to the source file. However, because the original variable in the target file is different than the original variable in the source file, the software 40 replaces the variable in the target file with a different variable abbreviation, i.e., a second new item, from the abbreviation the user and/or process applied in the source file, i.e., the first new item. The software 40 accesses one or more of the data libraries 130 both to define the change a user and/or process made to the source file and to support the subsequent change(s) that the software 40 makes to target files in order to maintain consistency across one or more computer systems. The data libraries 130 can store a large variety of data for the software 40 to access including regular expressions, symbols that represent words, foreign language dictionaries, program commands and prompts, etc.

In an embodiment of the present invention, software 40 retains the change and/or the type of change made to a source file, provided that the change and/or type of change is one that is defined in one or more of the data libraries 130, and provided that the same type of change can be applied by the software 40 to one or more target files. In this embodiment, software 40 retains the change and/or type of change in a local or network profile, associated with a user, and automatically applies the same type of change to additional files that the software 40 recognizes as target files. In a further embodiment of the present invention, the software 40 stores in one or more of the data libraries 130 one or more changes and/or one or more types of changes between a source file and all relevant target files, i.e., files that contain data to which the software 40 determines that a change and/or type of change should be implemented to maintain consistency across one or more computer systems. Thus, after a user and/or process implements one or more changes and/or one or more types of changes (recognized and supported by one or more of the data libraries 130) to a source file, the software 40 automatically implements the same type of change in the target files relevant to this source file. In order to identify the target files to change, in an embodiment of the present invention, the software 40 consults a predefined list of data sources stored on a system resource, such as in one or more of the data libraries 130.

Figure 2:
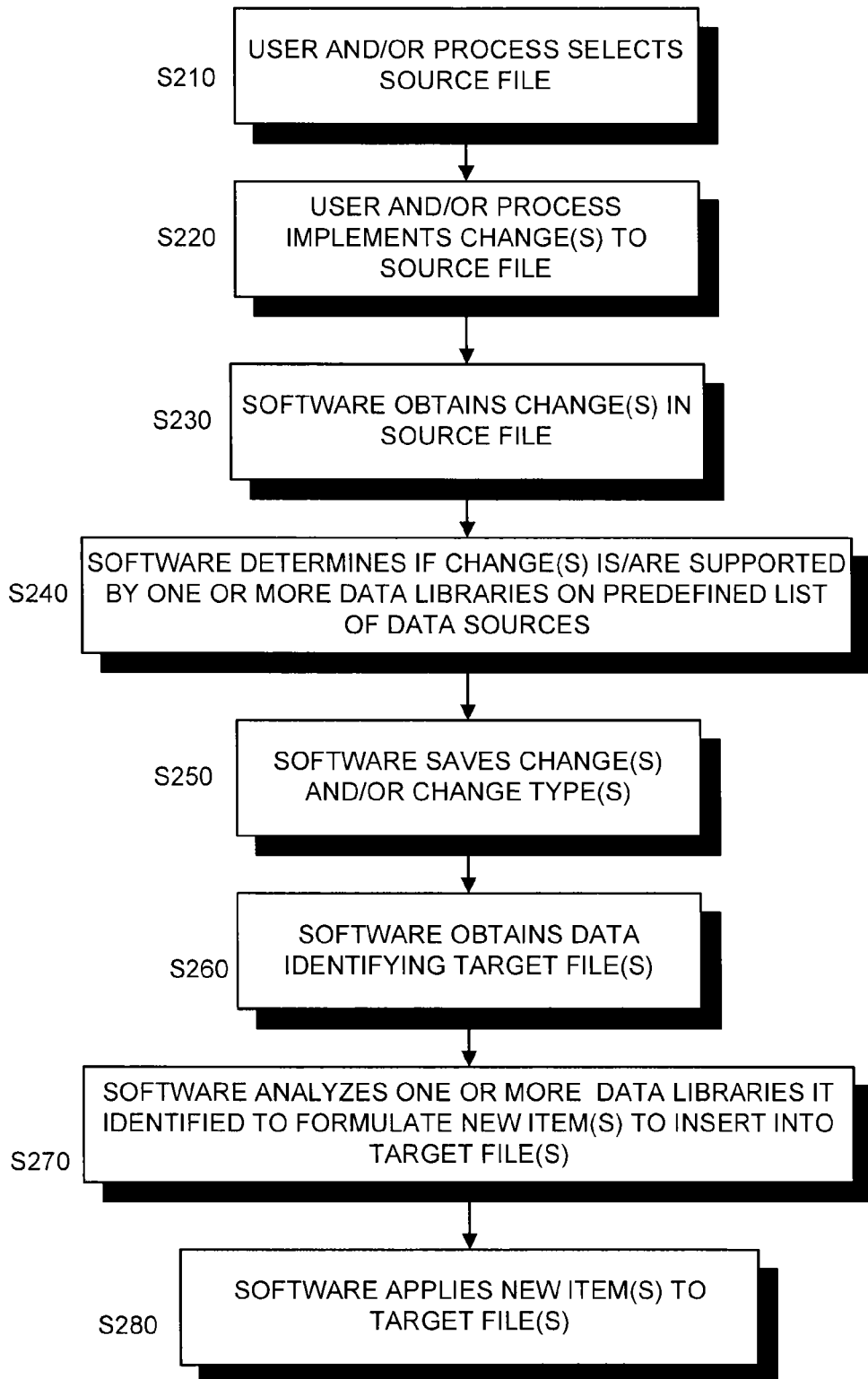
FIG. 2 depicts a workflow of one embodiment of a method for dynamically synchronizing elements in files, in accordance with one or more aspects of the present invention.

The computing environment 100 of FIG. 1 is one of many computing environments that can be utilized to perform the workflow of an embodiment of the present invention in FIG. 2.

Referring to FIG. 1 and subsequent Figures, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 2 depicts a workflow of one embodiment of a method for dynamically synchronizing elements in files, in accordance with one or more aspects of the invention. For ease of understanding, the actions of the software 40 are portrayed as a single-threaded process. However, one of skill in the art will recognize that further embodiments of the present invention utilize both single and multi-threaded processes.

Referring to FIG. 2, a user and/or a process accesses a source file utilizing a computing device, such as the server 120, a computer resource in the computer system 110, and/or a client computing device. As aforementioned, the actual location of the source file varies in accordance with the computing environment. At the computing device that serves as an access point, the user and/or process selects the source file, which in one example, is a web page file (S210). The user and/or process manipulates the source file. In an embodiment of the present invention, a user and/or process can make one or more changes to the source file. The user and/or process can make the one or more changes to the source file using, for example, an editor, such as a proprietary editor, a web browser plug-in, Word, WordPad, an email-related text editor (Notes, Outlook, web), XML editor, IDE, generic web form, or notepad (S220).

In accordance with embodiments of the present invention, a processor executing the software 40 obtains the changes the user and/or process made to the source file (S230). In an embodiment of the present invention, the processor executing the software 40 obtains the changes by tracking the changes through an audit trail while the changes are being made. During and/or after the user and/or process makes one or more changes to the source file, the processor executing the software 40 retains these changes on a memory resource in or accessible to the computer system 110.

The processor executing the software 40 then determines if the obtained changes are supported by one or more of the data libraries 130 on a pre-defined list of data sources (S240). In an embodiment of the present invention, to make this determination, the software 40 analyzes the changes utilizing the one or more data libraries 130 to establish whether the changes are supported by one or more of the data libraries 130. In embodiments where the processor executing the software obtains the changes by tracking the changes through an audit trail while the changes are being made, the software 40 determines whether the tracked changes are changes that are supported by one or more of the data libraries 130. The changed source file may contain one or more changes that are supported by one or more different data libraries 130.

Changes that are supported by data libraries 130 include, but are not limited to, editorial changes, translation of text into a different language, re-sizing of graphics, changes in color, format, font, and/or style. These changes can exist both within the content of a file but can also be comprised of file properties. For example, in an aspect of an embodiment of the present invention, a user and/or process changes the permissions required to edit a given file. By utilizing one or more data libraries 130, the software 40 identifies target files in the computing environment 100 with similar permission schemes to the edited file and gives the user the opportunity to implement the change across the environment 100.

After the software 40 obtains one or more changes made to a source file and determined that the changes are supported in one or more of the data libraries 130, the software 40 retains the one or more changes and/or one or more types of changes (S250) on a resource in the computing environment 100. In an embodiment of the present invention, the software 40 retains the determined one or more supported changes and/or one or more types of changes in a profile stored on a resource in the computing environment 100.

The software 40 obtains data identifying files to which the same type of change should be applied (S260). Data the software 40 uses to identify these files includes, but is not limited, to data identifying a machine, file type, development environment, QA environment, production environment, application, and/or computer system. By obtaining the data, the software 40 identifies these files (referred to now as target files) as containing elements that should be changed based upon the initial change the user and/or process made to the source file in order to maintain consistency across a given computing environment 100. In an embodiment of the present invention, the software 40 obtains the data identifying the files by consulting a predefined list of data sources.

After the software 40 has determined that a change is supported by one or more of the data libraries 130 and obtained data identifying additional files to which the software 40 can apply the same type of change, the software 40 applies the same type of change(s) to the target files (S280). In an embodiment of the present invention, the software 40 applies the same type of change(s) to the target files by overwriting existing items in the target files with the new items from one or more of the data libraries 130. In an embodiment of the present invention, after the software 40 has determined that a change is supported by a data library, the software 40 obtains the content of the changes that it will apply to the additional files from a data source, including but not limited to, a data library, a data source in the computing environment 100, and/or a data source accessible to a resource in the computing environment 100. In an embodiment of the present invention, the software 40 provides a preview of and/or reports the change before applying the same type of change(s) to a target file.

Figure 3:
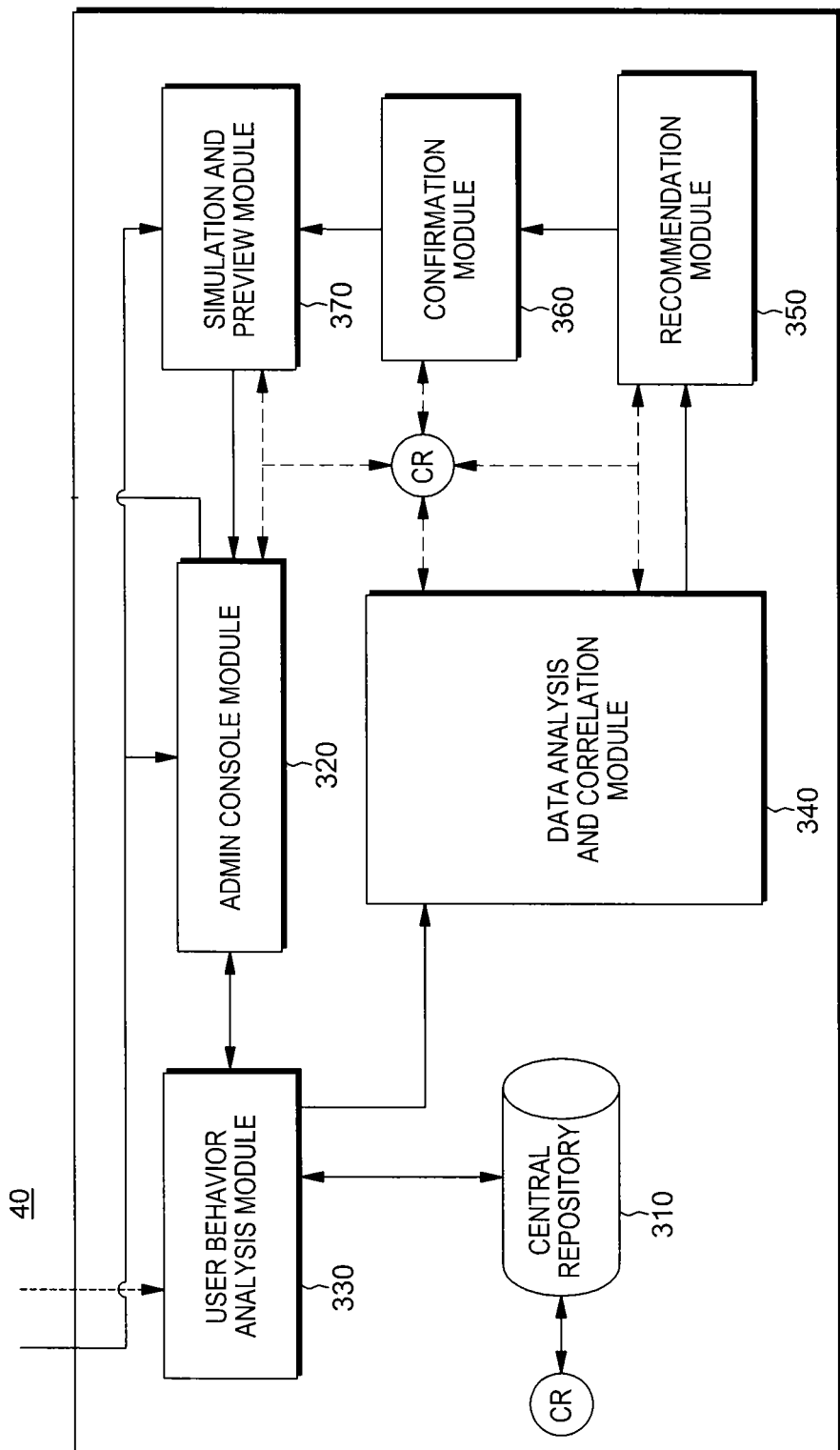
FIG. 3 depicts one example of a modular representation of one or more aspects of an embodiment of the present invention.

FIG. 3 depicts one example a modular representation of one or more aspects of an embodiment of the present invention. One of skill in the art will recognize variations of this embodiment, such as enabling the recited functionalities in different modules. The modules are separated in FIG. 3 for clarity and by way of example.

In the embodiment of FIG. 3, different functionalities in the workflow of FIG. 2 are separated into different computing modules of the software 40. These computing modules are comprised of computer code that is executed on one or more processors in a computer system, such as a client computing device and/or a server, and/or a computer resource that is accessed by a client computing device, such as a cloud resource. These modules can be local to one resource and/or distributed over a variety of resources in a computing environment.

A brief overview of each of the modules in FIG. 3 is followed by a more detailed description of each. In the embodiment of FIG. 3, the software 40 is comprised of the following modules: a Central Repository 310, an Administrative Console 320, a User Behavior and Analysis Module 330, a Data Analysis and Correlation Module 340, a Recommendation Module 350, a Confirmation Module 360, and a Simulation and Preview Module 370.

As aforementioned, the software 40 determines if a change to a source file is supported by one or more data libraries 130. Referring to FIG. 3, Central Repository 310 stores data, such as the data libraries 130, that the software 40 utilizes to determine that the changes that a user and/or process made to a source file, to identify target files to which the software 40 will make the same type of changes, and to make the same type of changes to the target files, and in some embodiments of the present invention, to formulate the change the software 40 makes to the additional files.

In this embodiment, a user may access Administrative Console 320 through a user interface on a computing device in a computing environment. The Administrative Console 320 of the software 40 allows a user with proper security privileges to edit the stored data in the Central Repository 310, including editing data in one or more data libraries 130.

In this embodiment, the User Behavior Analysis Module 330 obtains the change to the source file. The User Behavior Analysis Module 330 of the software 40 enables the software to observe and analyze the changes a user and/or process makes to the source file. In addition to logging the actual changes made in the Central Repository 310, for example, as an audit trail, the User Behavior Analysis Module 330 also contains code that allows the software 40 to log the type of changes made, predict additional changes, and even suggest changes to the user.

In this embodiment, the Data Analysis and Correlation Module 340 determines whether the change made to the source file is supported by one or more of the data libraries 130 in a pre-defined list of data sources (in the Central Repository 310). Program code in the Data Analysis and Correlation Module 340 of the software 40 analyzes the changes a user and/or process makes in the source file and matches those changes to changes supported by one or more of the data libraries 130 in the Central Repository 310.

In this embodiment, the Recommendation Module 350 analyzes one or more of the data libraries 130 that support the change, and the Recommendation Module 350 formulates the changes to the target files. The Recommendation Module 350 receives the changes observed by the User Behavior Analysis Module 330 and the one or more of the data libraries 130 in the Central Repository 310 that the Data Analysis and Correlation Module 340 matched to the changes and recommends changes to target files based on this data. In an embodiment of the present invention, the software 40 displays the recommendations to a user before implementing the recommended change(s) to one or more of the target files.

The Confirmation Module 360 tracks whether a user confirms the changes to target files recommended by the Recommendation Module 350. The software 40 displays the recommended changes to a user utilizing the Simulation and Preview Module 370. Thus, the Confirmation Module 360 and the Simulation and Preview Module 370 may work together to display recommended changes to target files to a user and to receive a response from the user for each recommended change.

In this embodiment, after Confirmation Module 360 receives a response from a user, the software 40 applies changes to the target files. In embodiments of the present invention, applying changes include, but is not limited to, overwriting existing text in the target files with new text the Recommendation Module 350 formulated, and/or changing the permissions of target files.

Figure 4:
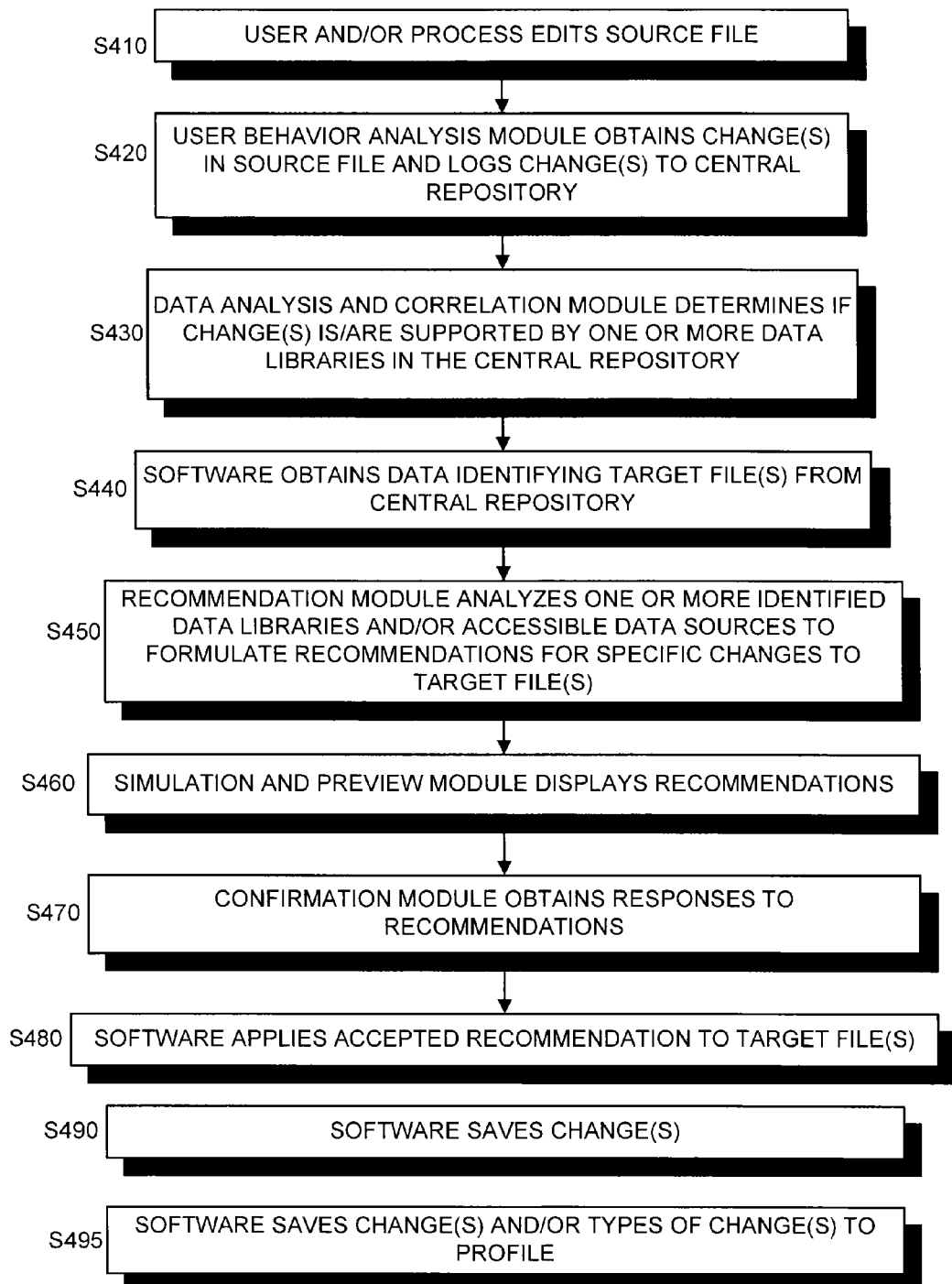
FIG. 4 depicts a workflow of one embodiment of a method for dynamically synchronizing elements in files, in accordance with one or more aspects of the present invention.

FIG. 4 depicts a workflow of one embodiment for a method for dynamically synchronizing elements in files, in accordance with one or more aspects of the present invention. Specifically, FIG. 4 depicts the software 40, as delineated into modules in FIG. 3, practicing an embodiment of the method. In FIG. 4, the various modules of the software 40 read, write, and analyze data in the Central Repository 310. Thus, FIG. 4 can be understood to depict the software 40 interacting with the data in the Central Repository 310.

Referring to FIG. 3, the aforementioned data libraries 130 that the software 40 utilizes to implement the type of changes to target files that a user and/or process previously applied to a source file, are located in a Central Repository 310. The software 40 stores data and accesses the data is stored in the Central Repository 310 in this embodiment of the present invention. Data stored in the Central Repository 310 includes, but is not limited to: 1) data utilized by the software 40 to analyze the changes made by a user to a source file and determine whether these changes are supported by one or more of the data libraries 130 (and the software 40 can implement the same type of changes in target files); 2) data the software 40 references to make supported changes to target files; 3) data the software 40 utilizes to aggregate files and/or portions of target files for analysis and editing; 4) data that comprises the changes and profiles containing changes and/or types of changes; 5) security information associated with the stored data, including, but not limited to, security associated with data libraries, changes, and/or profiles; 6) data that the software 40 obtained through graphical user interface (GUI) interactions with a user utilizing a client computing device; and 7) audit data that the software 40 logs by tracking changes made to files utilized by the system, including but not limited to source files, target files, and/or data libraries.

In an embodiment of the present invention, by interacting with a computer system though an interface that is part of the Administrative Console 320 of the software 40, a user, who meets security requirements, can edit the stored data in the Central Repository 310. A user with proper security credentials can utilize the interface to perform activities that include, but are not limited to, the following: change the permissions of users who utilize certain profiles, apply profiles to target files, update changes in established profiles, change the criteria the software 40 will use to identify target files, and/or change the permissions required for a user and/or process to access a given data library.

In embodiments of the present invention, the Central Repository 310 can reside on one of many physical machines and/or on an external memory resource. In an embodiment of the present invention, one or more of the modules depicted in FIG. 3, including the Central Repository 310, utilizes one or more resources in a shared data storage and management system, such as a cloud.

Returning to FIG. 4, a user and/or process implements one or more changes to a file, i.e., a source file, in a computing environment (S410). As the change is being made, the User Behavior Analysis Module 330 of the software 40 obtains the one or more changes and logs audit data in the Central Repository 310 (S420). This audit data comprises the state of the source file before the user and/or process made the one or more changes and the state of the source file after the user and/or process made the one or more changes.

The User Behavior Analysis Module 330 of the software 40 obtains the changes to the file by detecting when an original element of the source file is converted to a new element of the source file, for example, when an item in the source file is changed, such as text, formatting, and/or permissions. The User Behavior Analysis Module 330 of the software detects elements that include, but are not limited to, the number of occurrences of the change to the source file, the type of change, any trend in changes made to the source file by the user and/or process, the frequency of the changes, and/or the priority, if any, of the changes. In an embodiment of the present invention, the User Behavior Analysis Module 330 can recognize that the changes a user made to the source file correlate with an existing change profile in the Central Repository 310. The User Behavior and Analysis Module 330 supplies the obtained change to the Data Analysis and Correlation Module 340 to assist the Data Analysis and Correlation Module 340 in the software 40 in determining whether these changes are supported by one or more data libraries 130 in the Central Repository 310.

Additionally, in an embodiment of the present invention, the User Behavior and Analysis Module 330 assists users in catching erroneous changes made to source files. The User Behavior and Analysis Module 330 alerts users to possible problems with changes by assigning accuracy/confidence ratings to these changes. For example, if a user and/or process makes a change to a source file that caused errors 90% of the time when the software 40 implemented the change to target files in the past, the User Behavior and Analysis Module 330 logs and saves this information and assigns this change a low confidence score. Thus, when a user seeks to implement this change across target files in the computer system, the Recommendation Module 350 accesses the low confidence score assigned by the User Behavior and Analysis Module 330 of the software 40 and alerts the user, for example in a message in a GUI, that this change has a low confidence/accuracy rating and could cause system issues.

The Data Analysis and Correlation Module 340 determines if the change or changes made to a source file are supported by one or more data libraries 130 in the Central Repository 310. The Data Analysis and Correlation Module 340 of the software 40 utilizes data stored in the Central Repository 310 and analyzes the one or more changes made to the source file and determines whether any of the one or more changes is supported by data in one or more of the data libraries 130 in the Central Repository 310 (S430). In a further embodiment of the present invention, if the software 40 cannot locate one or more data libraries 130 in the Central Repository 310 to support a change made to a source file, the software 40 searches accessible resources, including publicly available resources on the Internet, to locate a data source to support the change. For example, if a user and/or process updates a zip code in a source file, the Data Analysis and Correlation Module 340 of the software 40 recognizes this change as a zip code update in a source file. However, if there is no zip code resource in one or more of the data libraries 130, the software 40 in the Data Analysis and Correlation Module 340 searches the web for a zip code repository it can reference to update all zip codes in system files. In a further embodiment of the present invention, after the software 40 locates this repository, the software 40 copies the repository and saves it in the Central Repository 310 for use in subsequent updates.

The software 40 obtains data identifying target files. In an embodiment of the present invention, the software 40 obtains this data from the Central Repository 310. The software 40 accesses the Central Repository 310 to obtain data that software 40 uses to identify target files, including to aggregate files and/or portions of target files for analysis and editing (S440). For example, in an embodiment of the present invention, the software 40 obtains a reference list from the Central Repository 310. This reference list correlates the changes supported by a given data library of data libraries 130 with the files in a computer environment that contain elements where the same type of change should be implemented if the change is made to a source file. Thus, in this embodiment, the reference list itself designates the target files.

Returning to FIG. 4, after the software 40 has obtained data identifying the target files, the software 40 utilizes the data to make the same type of changes in target files that the software 40 identified. Specifically, the software 40 analyzes the one or more relevant data libraries of data libraries 130 and/or any relevant resources accessible to the software 40, to formulate the specific changes that the software 40 will apply to existing items in these target files.

In this embodiment of the present invention, rather than automatically apply changes to identified target files, the Recommendation Module 350 of the software 40 analyzes the data libraries 130 and/or any relevant resources and creates recommendations for changes to target files based on changes the software 40 identified as being supported by one or more data libraries (S450). The software 40 displays the changes to a user with the Simulation and Preview Module 370 (S460) and records a user's acceptance and/or rejection of each displayed change with the Confirmation Module 360 (S470). Then, the software 40 applies the changes that the user accepted to the target files (S480).

As aforementioned, the Recommendation Module 350 can provide information to a user that assists the user in deciding whether the same type of change the user made to a source file should be implemented across target files in the computer system. In addition to providing a user with a confidence/accuracy rating, in embodiments of the present invention, the Recommendation Module 350 can also track the status of changes while they are being implemented to various target files, allowing the user to instruct the software 40 to stop or roll back the changes. The Recommendation Module 350 can be pre-configured in some embodiments of the present invention so that while the software 40 implements certain changes to certain files automatically, user approval is required for certain changes and/or certain files. The Recommendation Module 350 in some embodiments can be configured to automatically cancel application to a target file of a same type of a change made to a source file if the confidence/accuracy rating of the change does not meet a certain threshold. In a further embodiment of the present invention, the Recommendation Module 350 forms recommendations analyzing resources that include, but are not limited to, the data libraries 130, key words found in a source file, relevance, and/or historical data.

In the embodiment of FIG. 3, the Simulation and Preview Module 370 provides previews, including visuals and simulations, of the changes that the software 40 recommends are implemented to the target files by analyzing the relevant data libraries 130. For example, the functionality of the Simulation and Preview Module 370 includes, but is not limited to, displaying target files after changes are applied and creating simulations to simulate the functionality of the computer environment after the software 40 applies the changes to the target files, and/or validating supported changes before applying the changes to target files. In various embodiments of the present invention, the Simulation and Preview Module 370 can generate a report identifying the impact of implementing changes to the target files, display recommendations for additional retained changes or different changes, and display the success rate of the implementation of one or more changes.

The Simulation and Preview Module 370 can change the change, type of change and/or the contents of a profile based upon the responses from a user to the previews and simulations. For example, in an embodiment of the present invention, as a user selects and rejects different changes and/or types of changes in a given profile, Simulation and Preview Module 370 updates the saved profile in the Central Repository 310 to reflect these new preferences. Thus, should a user select this profile at a later time, the changes and/or types of changes the software 40 applies to target files will reflect the preferences of the earlier user.

In an embodiment of the present invention, the Simulation and Preview Module 370 checks the efficacy of a change to a source file before the software 40 applies the recommended changes to target files. For example, for a given change to a source file in a given embodiment, the Simulation and Preview Module 370 verifies that the target files exist, verifies that the paths to the target files are correct, checks whether the data library of data libraries 130 utilized contains useable data, and/or checks whether the identified target files contain elements to which the software 40 can apply the same type of change made to the source file.

In an embodiment of the present invention, after applying the same type of change to target files, the software 40 retains the change and/or type of change made to source file and then the target files by saving the change and/or type of change on a resource in or accessible to the Central Repository 310 (S490). In embodiments of the present invention, not only does the Confirmation Module 360 in FIG. 3 provide the functionality of soliciting a confirmation and/or rejection of one or more changes, but the Confirmation Module 360 also tracks the results, logging audit information as the user responds to each simulated change to a target file created by the Simulation and Preview Module 370. The Confirmation Module 360 logs confirmation and/or rejection data in the Central Repository 310 which data includes, but is not limited to, date of change, user who confirmed change, time of confirmation, location in file of change, and/or additional audit information. In an embodiment of the present invention, the User Behavior and Analysis 330 includes the confirmation retained data related to a given change when calculating the overall success rate of the change.

In an embodiment of the present invention, the changes that the software 40 applied to one or more of the target files may only reflect some of the changes that a user desires to make to files within the system. In this case, after the software 40 applies the change and/or profile, the user can continue to make changes to a displayed file. The software 40 can track these additional changes and add the changes and/or the types of changes to a profile the software 40 retained on a system resource.

The software 40 can save the change and/or the type of change as part of a profile (S495). In an embodiment of the present invention, subsequent users and/or processes can access the saved changes and/or profiles in the Central Repository 310 and use the software 40 to apply them to additional files.

In an embodiment of the present invention, whether or not the software 40 propagates a same type of change, made by a user in a source file, to one or more target files can depend upon the security clearance of the user. In the embodiment of FIG. 4, the Central Repository 310 stores security information associated with the stored data, including but not limited to, security associated with data libraries 130, changes, and/or profiles. Returning to FIG. 1, as aforementioned, the software 40 utilizes one or more data libraries 130 as resources when recognizing a change in a source file and deciding how the same type of change should be implemented to one or more target files that may contain different data. In various embodiments of the present invention, an administrator can assign permissions to data libraries 130 and files within the computer system, including files that become source files and target files. Whether a user utilizing software 40 has the appropriate permissions impacts how the software 40 applies the same type of changes to source file to one or more target files. In an embodiment of the present invention, a system administrator can configure permissions so that only a user with sufficient security credentials can access a given data library 130 and/or make changes to system files.

Accordingly, as set forth herein, the software 40 obtains security credentials from a client, i.e., the user and/or process, who implemented the change to the source file. Thus, when a user accesses the software 40, the software 40 determines whether the user can access a data library 130 and/or whether the user can make changes to target files. Therefore, even if a user has a made a change to a source file that is supported in a data library of data libraries 130, the software 40 will not make the same type of change to a target file if the user does not have sufficient permissions to access the data library of data libraries 130 that supports the change and/or if the user does not have sufficient permissions to edit the target file.

Returning to FIG. 4, depending upon whether the target files and/or the data libraries 130 supporting the changes require security privileges to access them, the software 40 obtains security credentials on the user while the software 40 determines whether a change is supported by a data library of data libraries 130 (S430) and when obtaining data identifying the target files (S440). In an embodiment of the present invention, the software 40 reports an error to the user if the change to the source file is identified and the same type of change cannot be applied to one or more target files due to the user not having sufficient permissions to access the data library of data libraries 130 and/or to edit the one or more target files.

A specific example can be understood by referring to the workflow of FIG. 4. For example, in an embodiment of the present invention, a user edits a source file. This source file contains computer code that when executed on one or more processors in a given computing environment enables users of the executed application to book airline travel. The user makes the following changes to the source file 1) the user changes the language from English to French for a certain type of variable; 2) the user changes the airport names to display as airport codes instead of names; 3) the user changes the currency to display as Euros instead of US dollars for (S410).

The software 40 obtains the changes being made to the source file in part by logging the changes as audit data in the Central Repository 310 (S420). The software 40 determines that each of the changes (the language change, the airport display change, and the currency change) is supported by a separate data library of data libraries 130 in the Central Repository 310 (S430). In this example, one data library contains an English/French language index, a second contains a list of international airport codes and full names, and a third contains a conversion rate for use in converting dollars to Euros. In this example, the data libraries 130 in the Central Repository 310 contain data the software 40 utilizes to formulate changes to target files. However, in further embodiments of the invention, although the software 40 uses data in the data libraries 130 to determine if a change is supported, the software 40 accesses internal and/or external data sources to formulate the actual changes to the target files.

The software obtains data identifying at least one target file. By referencing data in the Central Repository 310, the software 40 obtains data identifying files in the computer environment contain elements to which the same types of changes made to the source file should be applied in order to keep the various code executed by one or more processors to provide users to an application to book airline travel synchronized (S440). For the first change, the software 40 obtains data identifying target files that contain the certain type of variable that the user translated in the source file. For the last change, the software 40 obtains data identifying target files that contain full airport names. For the last change, the software 40 obtains data identifying target files that contain US currency designations.

After the software 40 obtains data identifying the target files, the software 40 applies the same type changes made to the source file to the target files by utilizing the appropriate data libraries of data libraries 130, after analyzing the data libraries to formulate recommendations of the changes to apply to each target file (S450), displaying these recommendations to the user (S460) and receiving feedback to confirm and/or reject the recommended changes (S470), and then applying the accepted changes (S480). In further embodiments of the present invention, the software 40 analyzes one or more data libraries of data libraries 130, formulates changes to apply to the target files, and applies the changes automatically.

As aforementioned, the data in the target files is not necessarily identical to the data in the source file. Rather, the changes made in the source file are types that are supported by one or more of data libraries 130. For example, a target file may have a different English word in the same variable type as the user changed in the source file. However, because the user changed the word to a French word, the software 40 applies the variable in the target file to a different French word, analyzing the English to French index in a data library of data libraries 130 that the software 40 determined supported this change.

In this embodiment, the software 40 saves the group of changes made to the source file and then supported by the three data libraries in the Central Repository 310 (S490) and can save the change and/or type of change as part of a profile (S495). Users and processes in the computer environments with appropriate permissions can access this profile in order to re-apply the profile to target files or apply the profile to new groups of files.

FIG. 3 is not an exhaustive illustration of all software modules in various embodiments of the present invention. In further embodiments, additional modules contribute additional functionality. For example, in an embodiment of the present invention, by using an Execution Module (not pictured), a user can configure when and how the software 40 will apply types of changes across target files. For example, the user may schedule the software 40 to apply a type of change, saved in the Central Repository 310, during a given window of time. In certain computing environments, certain files are not editable when certain services are active. Thus, the software 40 can only apply certain types of changes across the computing environment 100 when these services are shut down. For example, applying types of changes to files containing code utilized by a web server running on the server 120 may only be permitted when the web services on the server 120 are not running. In this situation, by utilizing an aspect of an embodiment of the present invention, a user can configure the software 40 to apply one or more types of changes during a scheduled down time for the affected files and systems. This aspect is additionally useful to phase certain types of changes so that the types of changes are applied to files and no overwriting occurs, preserving unwanted original content.

A user may also configure a review process for a type of change or profile or set permissions for a type of change or profile, including setting notifications for approvals, and notifications to stakeholders. The user may also rank the type of change and/or profile according to importance so that if the capacity of the system is an issue, the software 40 will applies the types of changes and/or profiles with higher ranks, e.g., VIP requests, before it implements lower ranked changes and/or profiles.

Figure 5:
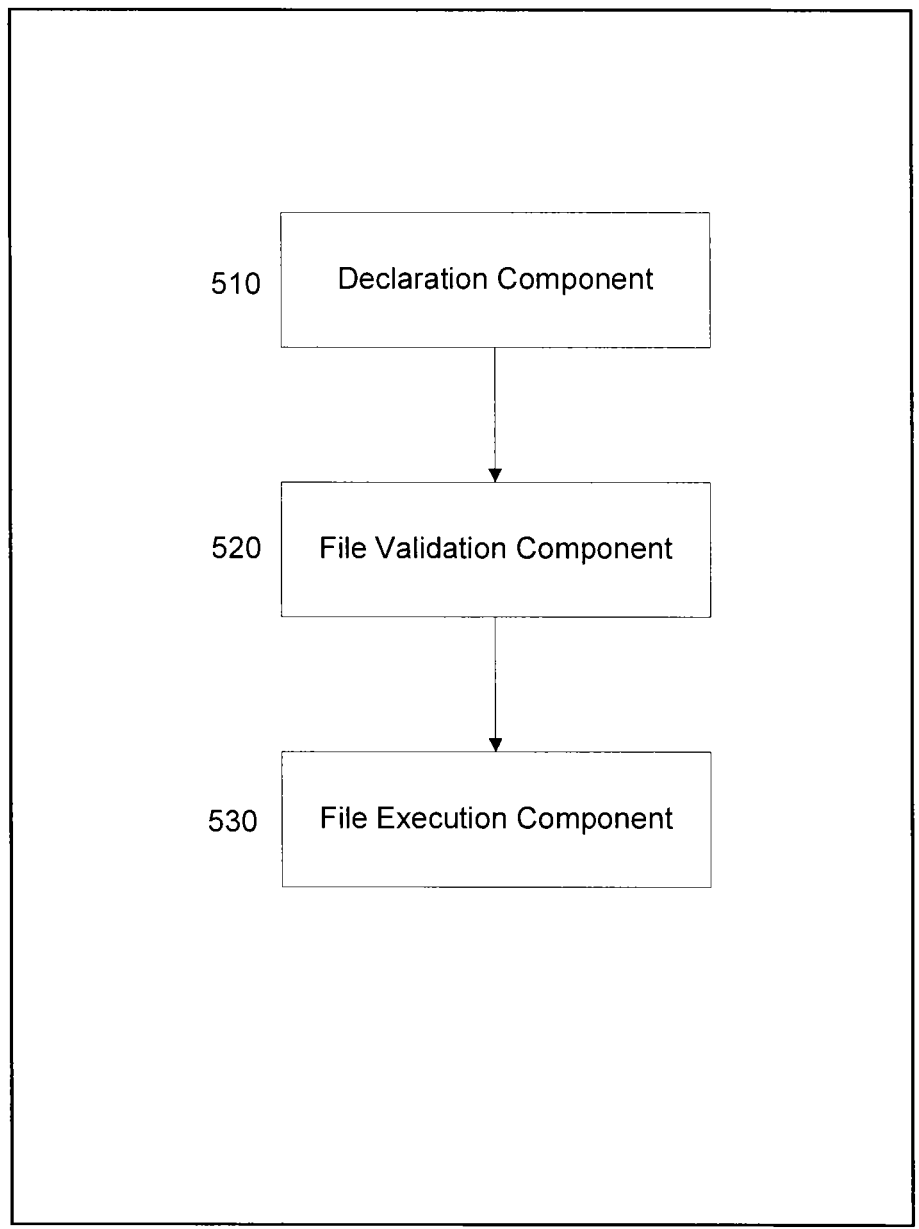
FIG. 5 depicts one example of a modular representation of one or more aspects of an embodiment of the present invention.

FIG. 5 depicts one example of a modular representation of one or more aspects of an embodiment of the present invention. FIG. 5 depicts three components of an embodiment of software 40: a declaration component 510, a file validation component 520, and an execution component 530. The declaration component 510 enables the software 40 to obtain data identifying target files for applying a type of change or saved profile. The file validation component 520 performs data quality checks prior to applying types of changes and/or profiles to target files. The file execution component 530 finds and applies types of changes to the identified target file(s), after the file(s) have passed file validation. Referring to FIG. 4, these components of the software 40 obtain data identifying the target files (S440), validate the changes (S450), and apply the types of changes (S480).

Returning to FIG. 5, the declaration component 510 obtains data identifying target files. A user interacting with the software 40 uses this declaration component 510 to "declare" and associate files to be processed. The software 40 obtains the data identifying target files as a result of the declarations. The declarations can include, but are not limited to, user declarations of file types, applications, file levels, file ownership, locations (e.g., directory, server (remote or local), java virtual machine), references and/or logical paths, textual or code elements that appear in the target file, for example, text and/or commands, and/or a list of file names. The user can also utilize the software 40 to exclude files when the software 40 applies certain types of changes based on at least these characteristics. The declaration component 510 of the software enables a user to declare target files both on the fly and/or by setting pre-defined criteria. The software 40 obtains this data identifying the files.

The software 40 obtains the declarations made by the user and retains them on either a remotely accessible or local resource. In an embodiment of the present invention, the software 40 can obtain a user's declaration for a given selected file, a declaration of the entire file, a line number(s), a section(s), and/or a range for which a given change and/or profile is applicable. In an embodiment of the present invention, the software 40 can obtain identification information from a user including, but not limited to, file properties, pattern matching, locale, timestamp(s), size(s), modified by, and/or type/extension.

In addition to obtaining data identifying files directly from a client, the declaration component 510 of the software 40, in certain embodiments of the present invention, can recommend unselected files for inclusion as target files. For example, if a user instructs the software 40 to apply a type of change, e.g., translating a file from Spanish to English, to files with "SP" in their file name, embodiments of the present in invention can recommend additional files that fit this criterion, for application of this change. As discussed in reference to FIG. 3, after the user accepts the recommendation made by the software 40, the software 40 raises the confidence level of the accepted recommendations for the given change.

In an embodiment of the present invention, the file validation component 520 of the software 40 performs data quality checks prior to applying types of changes and/or profiles to target files. In an embodiment of the present invention, the software 40 validates the data in target files and/or the file designations. For example, in an embodiment of the present invention, the software 40 receives a definition and/or list of acceptable values associated with a given change. For example, acceptable values for a given change can include accepted extensions, such as txt, xls, csv, etc. In this example, if an identified target file does not have an accepted file extension, the file validation component 510 will designate the file as invalid and the software 40 will not apply the type of change to this file. The validation activities carried out by the file validation component 520 can include, but are not limited to, validating standard file/permission, including checking whether the given directory/file identified in the target file list input by the user exists, validating user permission to work with the target files, and/or validating permissions for creating a backup. In order to validate the target files, the software 40 can auto generate a script that will be run as part of applying types of changes and/or a profile to a target file to determine the correct path for an improperly identified target file. In an embodiment of the present invention, the software 40 logs any errors from the validation. The software 40 can display these errors to the user who designated the files, which will enable the user to make corrections.

In an embodiment of the present invention, the file execution component 530 applies the changes to the defined target file(s), after the file(s) have passed file validation.

Referring to the components in the embodiment of FIG. 5, a user can use this embodiment to deploy resources from one computer system to a computer system in a different geography. In this example, a standard Information Systems Management (ISM) development environment is the technical architecture utilized. This ISM environment includes 2 servers and 10 Java Virtual Machines (JVMs). Each JVM has a web deployment descriptor and associated properties file+LDAP xml. The user desires to redeploy the environment for another account at a different geography.

In an embodiment of the present invention, to deploy at a different geography, the user inputs file identification data into a client and the declaration component 510 of the software 40 obtains the data identifying the target files. The user makes editorial changes to a source file, which the software 40 obtains and determines are supported by one or more data library of data libraries 130. For example, in this given source file, the user can change the ISM account, the naming convention of the airport (e.g., full name to abbreviation), the name of the country (e.g., full name to abbreviation), the language in which the file is written (e.g., English to Chinese), the format of the date, and/or the time zone.

The software 40 determines that one or more data libraries of data libraries 130 support these changes and saves the supported changes and/or the types of changes to a system resource. The software 40 can retain the changes, potentially in profiles. The software 40 analyzes the identified data libraries and formulates the new items that will be applied to the target files to implement the type of change from the source file. In this embodiment, the software 40 can apply the type of change either automatically or at a later time that the user schedules using the software 40. However, in the embodiment of FIG. 5, before the file execution component 530 of the software 40 applies the type of change, the file validation component 520 validates the target files that the user identified and/or suggests additional files. In further embodiments of the present invention, the software 40 applies the type of change without file validation.

FIGS. 2 and 4 show the application of one change and/or profile to a group of target files. However, software in embodiments of the present invention is capable of negotiating the applications of two or more types of change and/or profile to one or more target files, even when the type of changes conflict.

In an embodiment of the present invention, referring to FIG. 5, a user and/or process can input data that causes the software 40 to obtain data identifying the same target file for different profiles. For example, the software 40 obtains data identifying three different profiles with different changes to apply to the same target file: one user profile converts all currency to Japanese Yen, a second changes all airport names to airport codes, the third changes formatting using table tags to section tags in files that render the content of web pages. The software 40 obtains data identifying a target file that contains currency information, airport names, and a table. The software 40 applies the same types of changes consistent with different profiles to different portions of the target file. In some cases, the software 40 may apply same types of changes in more than one profile to the same portion of a target file. For example, in the present example, the software 40 will change a currency listing in a table to be displayed both in Yen and to utilize sections instead of table cells.

In some situations, two profiles applicable to the same target file can be mutually exclusive. In this case, in an embodiment of the present invention, the software 40 applies the profiles in a pre-defined or calculated order of priority. For example, a user could have a profile for deleting currency information pertaining to motor vehicles and another for converting all currency to Euros. On a target file containing car prices, if the car information profile carries a higher priority than the currency profile, the software 40 deletes the prices, but if the currency profile carries a higher priority, the software 40 converts the car prices to Euros. In another embodiment of the present invention, the software 40 utilizes priorities associated with different changes within different profiles, or within the same profile to determine the order in which the changes are applied.

In the examples above, only a single change was associated with each profile, however, these examples are offered merely for clarity. One of skill in the art will recognize that an unlimited number of changes as well as an unlimited number of data libraries can be associated with a given profile and/or group of changes, in various embodiments of the present invention. For example, a single profile can contain instructions to convert all currency to Japanese Yen, change all airport names to airport codes, and convert table tags to section tags in code. In one example, to apply this profile to a target file, the software 40 consults a data library with entries of conversions rates of various world currency to Japanese Yen, a data library that matches airport codes to full names, and a data library with formatting instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
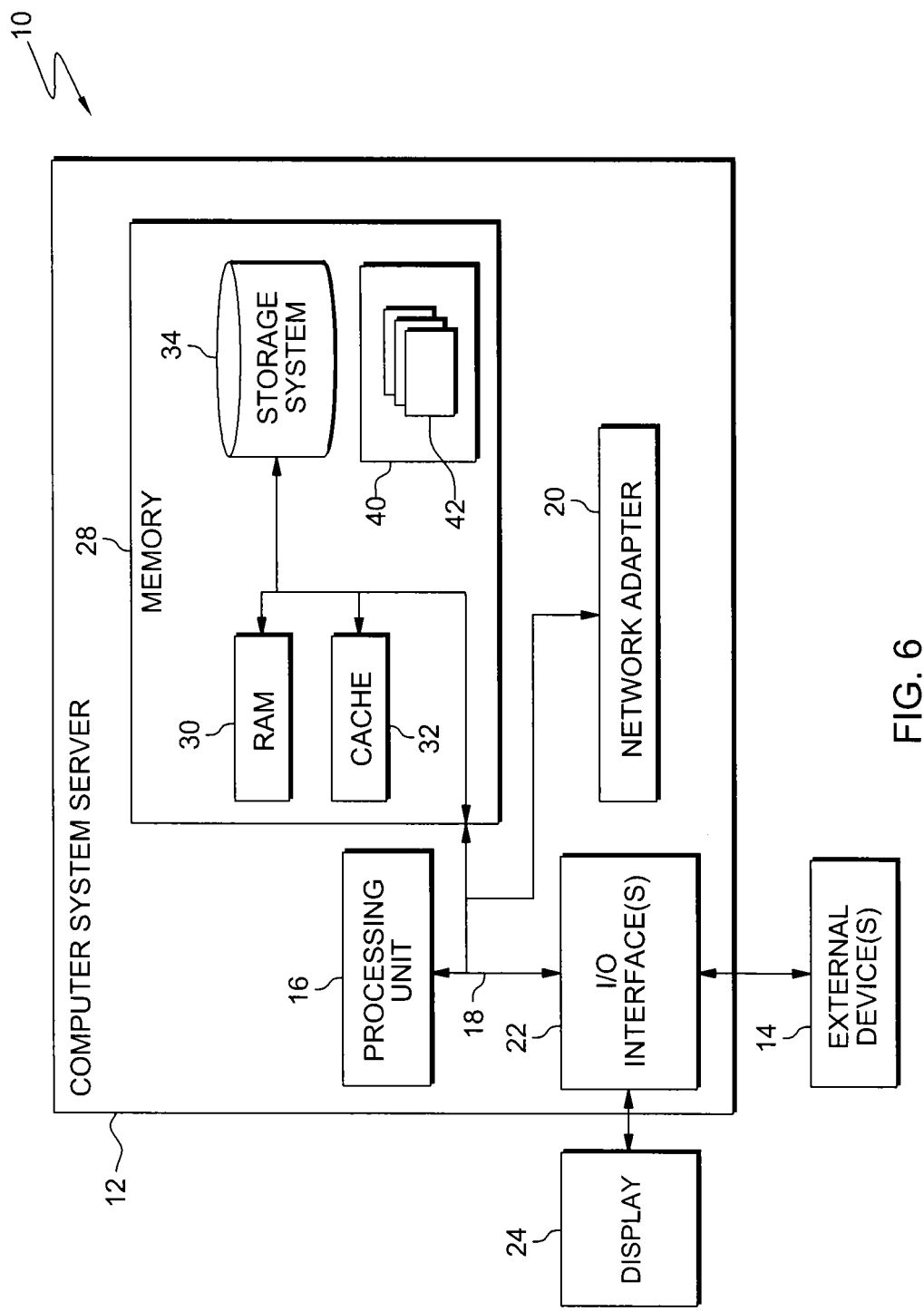
FIG. 6 depicts a schematic of an example of a cloud computing node.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Software 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
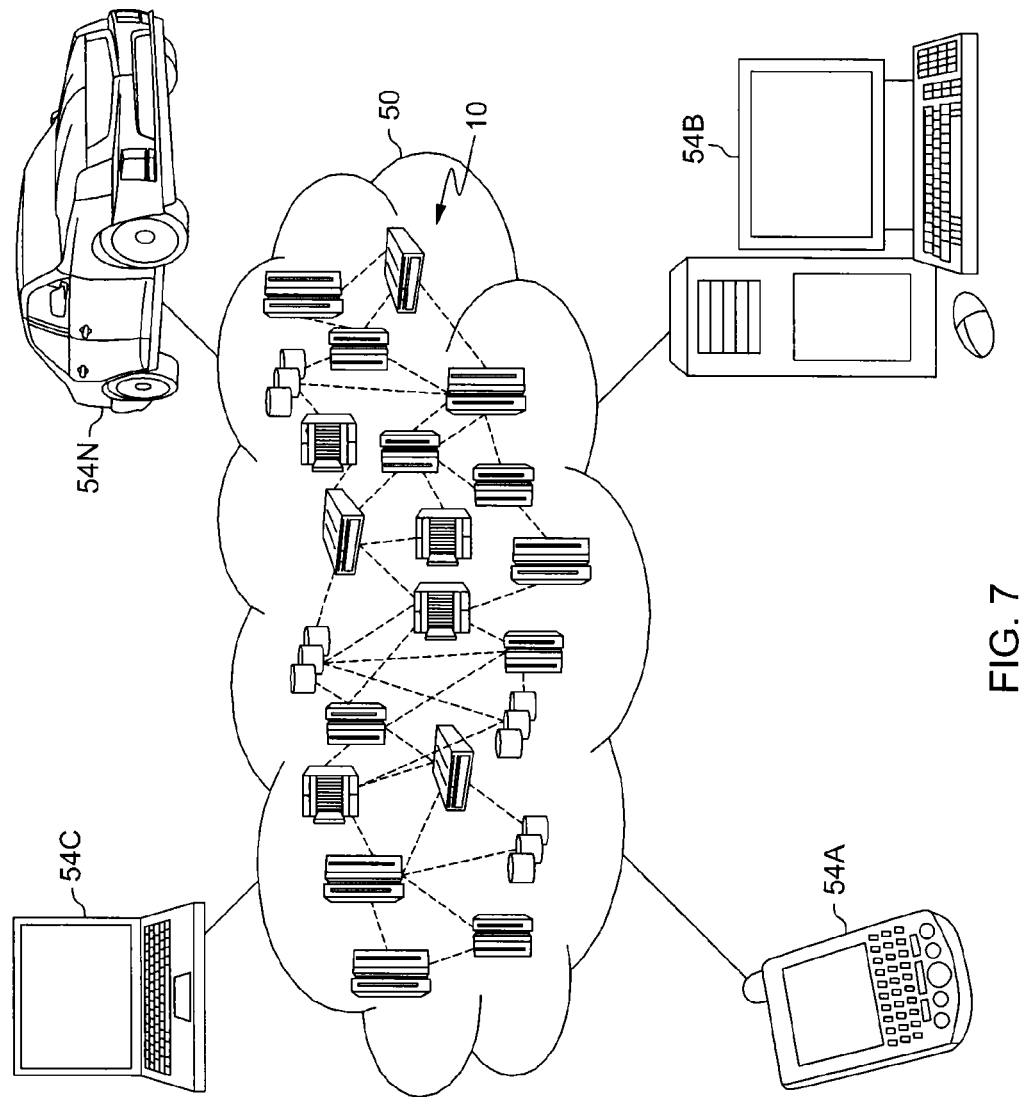
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
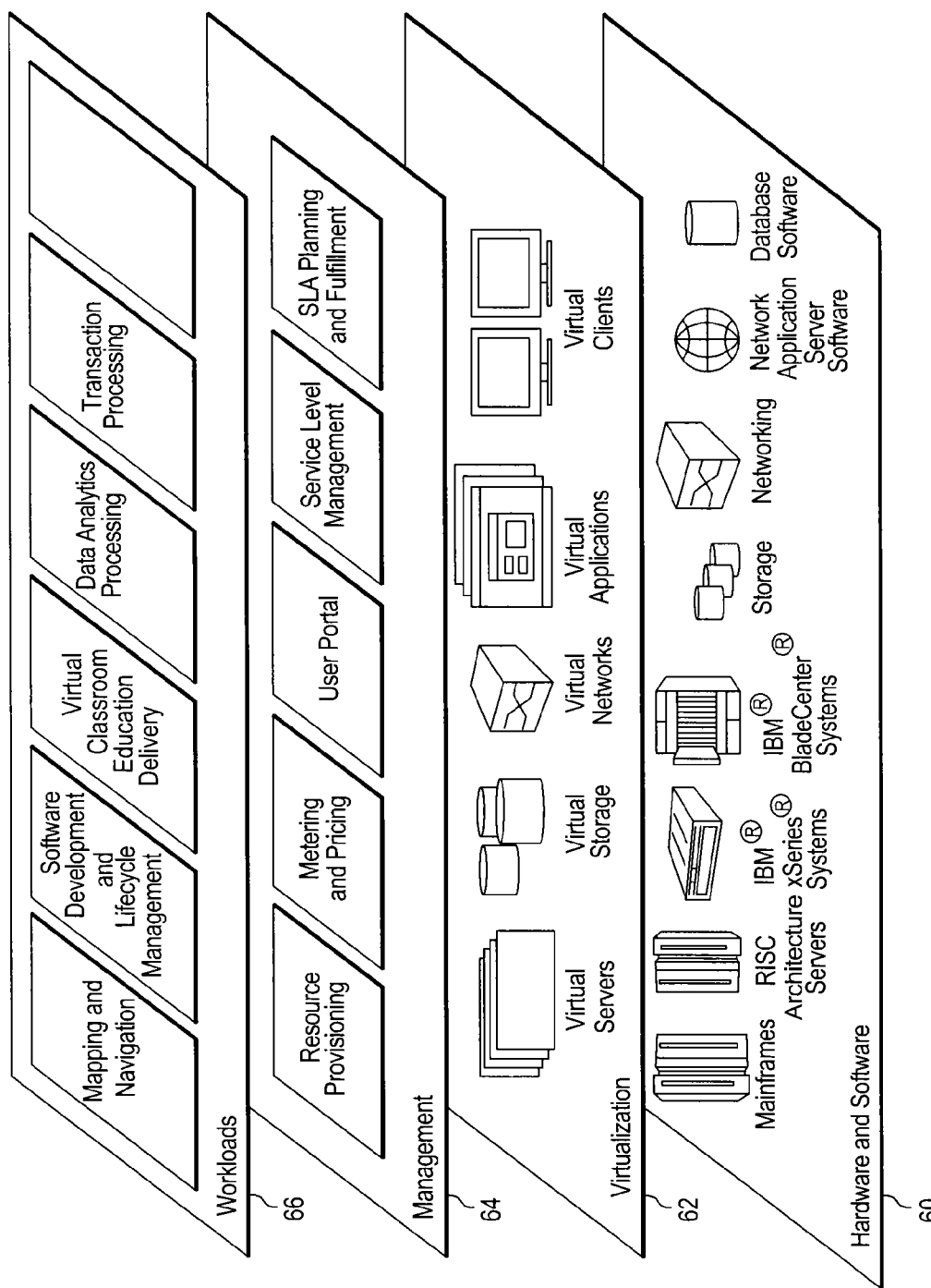
FIG. 8 depicts abstraction model layers according to an embodiment of the present invention.

Referring now to FIG. 8, a set of functional abstraction layers provided by cloud computing environment 50 (FIG. 6) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; retention and application of library data in accordance with user profiles, which may also be stored at this layer.

Based on the foregoing, a computer system, method, and program product have been disclosed for dynamically synchronizing files in a defined computer environment. However, numerous modifications and substitutions can be made without deviating from the scope of the present invention. Therefore, the present invention has been disclosed by way of example and not limitation.

Figure 9:
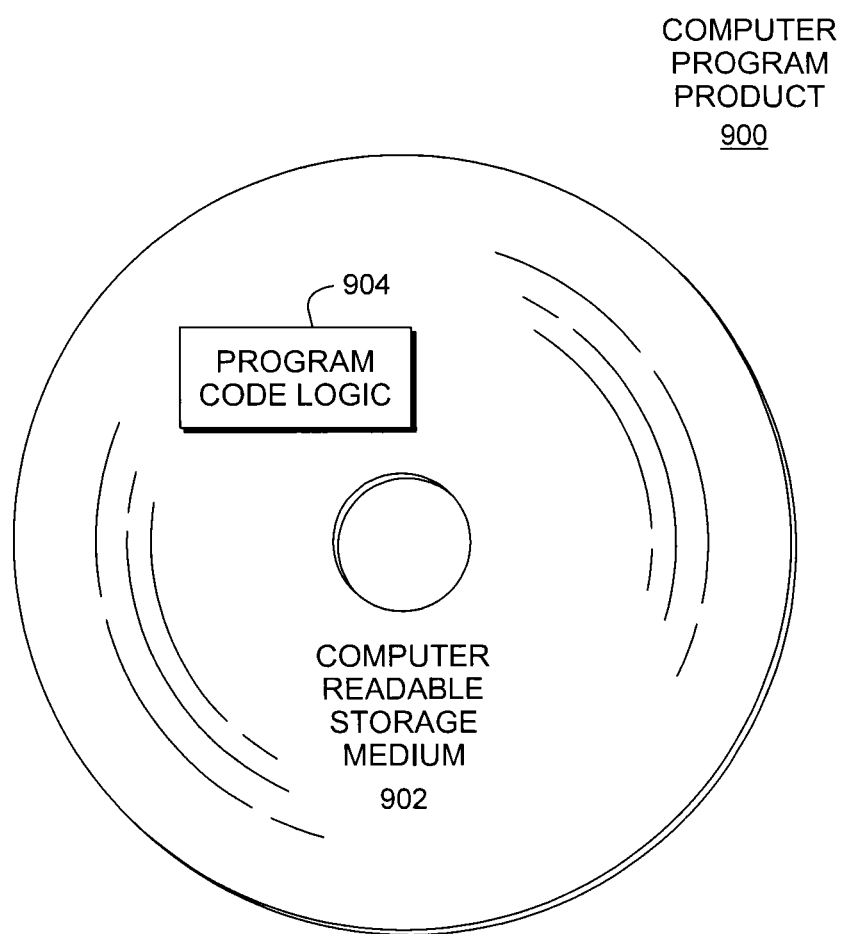
FIG. 9 depicts a computer program product utilized to practice one or more aspects of an embodiment of the present invention.

Using the processing resources of a resource to execute software, computer-readable code or instructions, does not limit where this code is can be stored. Referring to FIG. 9, in one example, a computer program product 900 includes, for instance, one or more computer readable storage media 902 to store computer readable program code means or logic 904 thereon to provide and facilitate one or more aspects of the present invention. In one embodiment, the computer readable program code means or logic 904 includes program code for software 40.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically synchronizing elements in a technical environment, the method comprising:
   obtaining, by a processor, a first change to a first file, and data identifying a second file;
   determining, by the processor, the first change supported by a data library specified in a pre-defined list of data sources and identifying the data library supporting the first change, wherein the data library includes library data that defines and supports changes in files and functionalities provided by technical resources;
   based on the identifying, analyzing, by the processor, the data library to determine a type of the first change; and
   applying, by the processor, a second change to the second file, wherein the second change is the type of the first change, wherein the first change and the second change are not identical, and wherein the second change is supported by one or more data library.

2. The method of claim 1, further comprising, before the applying:
   creating a simulation of the second file with the second change applied; and
   soliciting a response from a client in connection with the simulation.

3. The method of claim 2, further comprising:
   saving the response from the client;
   saving the type of change; and
   associating a score with the type of change based on the response.

4. The method of claim 3, further comprising:
   obtaining an instruction selecting the saved type of change;
   obtaining data identifying a third file;
   applying a third change to the third file, wherein the third change is of the saved type of change; and
   indicating the score to a client.

5. The method of claim 1, further comprising:
   obtaining additional data identifying a plurality of files; and
   applying a change of the determined type of change to each file of the plurality of files.

6. The method of claim 1, wherein the obtaining comprises obtaining the data identifying the second file from a pre-defined list in the data library.

7. The method of claim 3, wherein the associating further comprises evaluating whether the score is above a pre-defined score.

8. A computer program product for dynamically synchronizing elements in a technical environment, the computer program product comprising a computer readable storage medium and program code stored on the computer readable storage medium, the program code executable by a processing circuit to perform a method comprising:
   obtaining, by the processing circuit, a first change to a first file and data identifying a second file;
   determining, by the processing circuit, the first change supported by a data library specified in a pre-defined list of data sources and identifying the data library supporting the first change, wherein the data library includes library data that defines and supports changes in files and functionalities provided by technical resources;
   based on the identifying, analyzing, by the processing circuit, the data library to determine a type of the first change; and
   applying, by the processing circuit, a second change to the second file, wherein the second change is the type of the first change, wherein the first change and the second change are not identical, and wherein the second change is supported by one or more data library.

9. The computer program product of claim 8, wherein the applying comprises:
   creating a simulation of the second file with the second change applied; and
   soliciting a response from a client in connection with the simulation.

10. The computer program product of claim 9, the method further comprising:

saving the response from the client;
saving the type of change; and
associating a score with the type of change based on the response.

11. The computer program product of claim 10, the method further comprising:
obtaining an instruction selecting the saved type of change;
obtaining data identifying a third file;
applying a third change to the third file, wherein the third change is of the saved type of change; and
indicating the score to a client.

12. The computer program product of claim 8, the method further comprising:
obtaining additional data identifying a plurality of files; and
applying a change of the determined type of change to each file of the plurality of files.

13. The computer program product of claim 8, wherein the obtaining comprises obtaining the data identifying the second file from a pre-defined list in the data library.

14. The computer program product of claim 10, wherein the associating further comprises evaluating whether the score is above a predefined score.

15. A computer system for dynamically synchronizing elements in a technical environment, the computer system comprising a computer readable storage medium, a processor, and program code stored on the computer readable storage medium and executable by the processor to perform a method comprising:
obtaining, by the processor, a first change to a first file, and data identifying a second file;
determining, by the processor, the first change supported by a data library specified in a pre-defined list of data sources and identifying the data library supporting the first change, wherein the data library includes library data that defines and supports changes in files and functionalities provided by technical resources;
based on the identifying, analyzing, by the processor, the data library to determine a type of the first change; and
applying, by the processor, a second change to the second file, wherein the second change is the type of the first change, and wherein the first change and the second change are not identical, and wherein the second change is supported by one or more data library.

16. The computer system of claim 15, wherein the applying comprises:
creating a simulation of the second file with the second change applied; and
soliciting a response from a client in connection with the simulation.

17. The computer system of claim 16, the method further comprising:
saving the response from the client;
saving the type of change; and
associating a score with the type of change based on the response.

18. The computer system of claim 15, the method further comprising:
obtaining additional data identifying a plurality of files; and
applying a change of the determined type of change to each file of the plurality of files.

19. The computer system of claim 15, wherein the obtaining comprises obtaining the data identifying the second file from a pre-defined list in the data library.

20. The computer system of claim 15, the method further comprising:
obtaining an instruction selecting the determined type of change;
obtaining data identifying a third file;
applying a third change to the third file, wherein the third change is of the determined type of change; and
indicating a score to a client.

* * * * *